(12) United States Patent
Grobauer et al.

(10) Patent No.: US 8,612,231 B2
(45) Date of Patent: *Dec. 17, 2013

(54) METHOD AND SYSTEM FOR SPEECH BASED DOCUMENT HISTORY TRACKING

(71) Applicant: Nuance Communications Austria GmbH, Vienna (AT)

(72) Inventors: Gerhard Grobauer, Vienna (NL); Miklos Papai, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,679

(22) Filed: Dec. 14, 2012

(65) Prior Publication Data

US 2013/0103401 A1   Apr. 25, 2013

Related U.S. Application Data

(63) Continuation of application No. 13/366,123, filed on Feb. 3, 2012, now Pat. No. 8,364,489, which is a continuation of application No. 12/096,068, filed as application No. PCT/IB2006/054191 on Nov. 10, 2006, now Pat. No. 8,140,338.

(30) Foreign Application Priority Data

Dec. 8, 2005   (EP) ..................... 05111830

(51) Int. Cl.
*G10L 15/26*   (2006.01)
*G06F 3/00*   (2006.01)

(52) U.S. Cl.
USPC ............ 704/270; 704/235; 715/229; 715/230

(58) Field of Classification Search
None
See application file for complete search history.

(56) References Cited

U.S. PATENT DOCUMENTS 5,960,447 A   9/1999   Holt et al.
5,966,512 A *   10/1999   Bates et al. ................ 709/205

(Continued)

FOREIGN PATENT DOCUMENTS

EP   0 229 232 A2   7/1987
JP   8166946   6/1996
JP   2001-042996   2/2001

OTHER PUBLICATIONS

Office Action in Japanese Patent Application No. 2008-543945 dated Dec. 9, 2011 and mailed Jan. 4, 2012.

(Continued)

*Primary Examiner* — Brian Albertalli
(74) *Attorney, Agent, or Firm* — Wolf, Greenfield & Sacks, P.C.

(57) ABSTRACT

A method and a system of history tracking corrections in a speech based document are disclosed. The speech based document comprises one or more sections of text recognized or transcribed from sections of speech, wherein the sections of speech are dictated by a user and processed by a speech recognizer in a speech recognition system into corresponding sections of text of the speech based document. The method comprises associating of at least one speech attribute (14) to each section of text in the speech based document, said speech attribute (14) comprising information related to said section of text, respectively; presenting said speech based document on a presenting unit (8); detecting an action being performed within any of said sections of text; and updating information of said speech attributes (14) related to the kind of action detected on one of said sections of text for updating said speech based document, whereby said updated information of said speech attributes (14) is used for history tracking corrections of said speech based document.

15 Claims, 2 Drawing Sheets

(56) References Cited

U.S. PATENT DOCUMENTS

Figure 1:
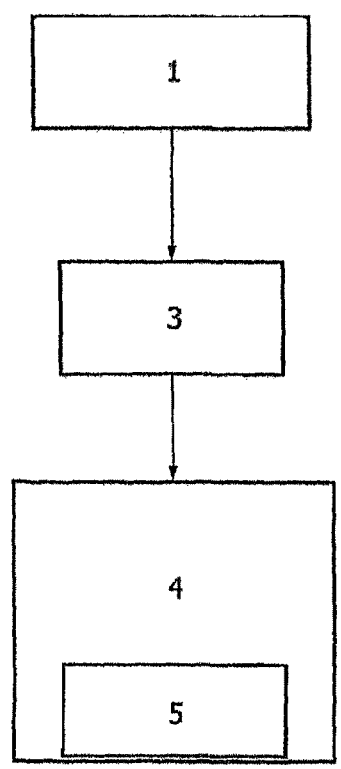

| | | | |
|---|---|---|---|
| 6,374,214 | B1 | 4/2002 | Friedland et al. |
| 6,457,031 | B1 | 9/2002 | Hanson |
| 6,961,700 | B2 | 11/2005 | Mitchell et al. |
| 6,996,528 | B2 | 2/2006 | Morin et al. |
| 7,058,888 | B1 * | 6/2006 | Gjerstad et al. ............... 715/235 |
| 7,444,285 | B2 | 10/2008 | Forbes |
| 7,689,422 | B2 | 3/2010 | Eves et al. |
| 7,788,237 | B2 | 8/2010 | Voronov et al. |
| 2002/0095291 | A1 | 7/2002 | Sumner |
| 2002/0156816 | A1 | 10/2002 | Kantrowitz et al. |
| 2004/0024601 | A1 | 2/2004 | Gopinath et al. |
| 2005/0099398 | A1 | 5/2005 | Garside et al. |

OTHER PUBLICATIONS

Rubin, C., "Microsoft Office Word 2003 Official ual," 1$^{st}$ ed., Nikkei BP Softpress, Jul. 12, 2004, pp. 799-812.

Japanese Office Action corresponding to Application No. JP2008-543945, dated Aug. 5 2012, 4pgs.

European Communication corresponding to Application No. EP06821392.5-1527, dated Sep. 7, 2012, 5pgs.

De Veth et al., "Phase-Corrected Rasta for Automatic Speech Recognition Over the Phone," Acoustics, Speech, and Signal Processing, 1997 (ICASSP-97), IEEE International Conference, Apr. 21-24, 1997, Munich, Germany, Los Alamitos, California, USA, IEEE Computer Society, vol. 2, Apr. 21, 1997, pp. 1239-1242.

Mangu et al., "Error Corrective Mechanisms for Speech Recognition," Proceedings of the 2001 IEEE International Conference on Acoustics, Speech, and Signal Processing (ICASSP), May 7-11, 2001, Salt Lake City, Utah; IEEE International Conference on Acoustics, Speech, and Signal Processing (ICASSP), New York, New York, IEEE, vol. 1 of 6, May 7, 2001, pp. 29-32.

Brief Communication corresponding to EP Application No. 06821392.5 mailed Nov. 23, 2012.

Minutes of Oral Proceedings corresponding to EP Application No. 06821392.5 mailed Dec. 14, 2012.

Decision to Refuse corresponding to EP Application No. 06821392.5 mailed Dec. 14, 2012.

* cited by examiner

METHOD AND SYSTEM FOR SPEECH BASED DOCUMENT HISTORY TRACKING

This application is a continuation under 35 U.S.C. §120 of U.S. patent application Ser. No. 13/366,123, filed Feb. 3, 2012, which is a continuation of U.S. patent application Ser. No: 12/096,068 filed Jun. 4, 2008, entitled "Method and System for Speech Based Document History Tracking," which claims the benefit under 35 U.S.C. §371 of International Patent Application No. PCT/IB2006/054191 filed Nov. 10, 2006, entitled "Method and System for Speech Based Document History Tracking," which claims the benefit of European Patent Application No. 05111830.5 filed Dec. 8, 2005, the complete disclosures of which are incorporated herein by reference.

This invention pertains in general to the field of Speech Recognition. More particularly the invention relates to a method and system for history tracking of changes in text portions of a document and more particularly to provide a tracking infrastructure for resolving ambiguities in a document creation workflow.

The invention further relates to a computer-readable medium having embodied thereon a computer program for performing said method by a computer.

Speech recognition systems are becoming increasingly effective and are well used within a plurality of industries today. Speech recognition is the process by which an acoustic signal received by a microphone is converted to a document, comprising a set of words, by a computer. These recognized words may then be used in a variety of applications for different purposes. The automatic speech recognition systems, which convert speech into text, result in cost-efficient document creation and high transcription productivity.

The fact that the document needs to be corrected or reviewed subsequently by the author, transcriptionists, Quality assurance (QA) persons or others by means of revising the document by hand or by dictation, increases the complexity of these speech recognition systems.

Several ideas of improving the speech recognition accuracy have been proposed over the last few years. One example, US Patent Application No. 2002/0156816, discloses a method and apparatus for learning from users self-corrections, revisions and modifications. Changes that are made to the current text results in a transformed text and based on the changes, a rule is devised which is saved for future use.

It is known that correctionists editing documents created by speech recognition systems have to deal with the fact that parts of the document might not have been recognized properly by the speech recognizer and/or have been corrected by the author. In both cases the written text does not match what the author dictated, i.e. either the speech recognizer has misinterpreted the dictated speech and the recognized text is faulty, or the author has gone through the transcribed or recognized text and made changes, for instance because the author either made a correction or a change of mind concerning the contents of the text. In common speech recognition products this dilemma is either not solved at all or tracked via meta information which is not part of the document, for instance by means of document attributes like "already corrected by author" or "needs correction". In any case, this is not satisfactory and the hitherto known speech recognition products are either clumsy or lack reliability.

Hence, an improved system for tracking changes made in a speech based document would be advantageous.

Accordingly, it is an object of the present invention to provide an improved system for tracking changes made in a speech based document. To achieve this object a method and a system are provided for tracking history changes of speech based documents, according to the appended patent claims.

More specifically, the present invention relates to a speech enabling framework which supports tracking on sections of text, e.g. words, phrases, by automatically applying speech attributes to all sections of the document. This is a new way of keeping track of all of the change history of each section of text or sound, which allows at each stage of the document workflow to find out which steps led to the current text or sound of the speech based document. The correctionists question "What did the author really mean, what's written in the text or what can be heard?" and the quality assurance person's question "Who introduced a specific error into the document?" can finally be answered. That means, the invention provides a speech recognition system that at all times enables a reliable speech based document, which for instance may easily provide the current authentic text of a speech based document, or which may easily be corrected when errors are found in the speech based document.

According to one aspect of the invention, a method of history tracking corrections in an electronic document is provided, wherein the electronic document is a speech based document comprising one or more sections of text recognized or transcribed from sections of speech. The sections of speech are dictated by a user and processed by a speech recognizer in a speech recognition system into corresponding sections of text of the speech based document. The method comprises steps of associating at least one speech attribute to each section of text in the speech based document, the at least one speech attribute comprising information related to said section of text, respectively. The method also comprises steps of presenting said speech based document on a presenting unit, detecting an action being performed within any of the sections of text and updating information of the at least one speech attribute related to the kind of action detected on one of the sections of text for updating the speech based document, whereby the updated information of the at least one speech attribute is used for history tracking corrections of the speech based document.

According to another aspect of the invention, a system for history tracking corrections in an electronic document is provided, wherein said electronic document is a speech based document comprising one or more sections of text recognized or transcribed from sections of speech. The sections of speech are dictated by a user and processed by a speech recognizer in a speech recognition system into corresponding sections of text of the speech based document. The system comprises means for associating at least one speech attribute to each section of text in the speech based document. The at least one speech attribute comprises information related to the sections of text, respectively. The system also comprises at least one presentation unit for presenting said speech based document thereon, means for detecting an action being performed within any of the sections of text and means for updating information of said speech attributes related to the action detected on one of the sections of text for updating the speech based document, whereby said updated information of said speech attributes is used for history tracking corrections of the speech based document in use of the system.

According to a further aspect of the invention, a computer-readable medium having embodied thereon a computer program for processing by a computer is provided. The computer program being configured for history tracking corrections in an electronic document, wherein the electronic document is a speech based document comprising one or more sections of text recognized or transcribed from sections of speech. The computer program comprises a code segment for associating at least one speech attribute to each section of text in the speech based document, the speech attribute comprises information related to the section of text, respectively. The computer program also comprises code segments for presenting the speech based document on a presenting unit, a code segment for detecting an action being performed within any of the sections of text and a code segment for updating information of the speech attributes related to the kind of action detected on one of the sections of text for updating the speech based document, whereby said updated information of said speech attributes is used for history tracking corrections of said speech based document.

The benefits of the history tracking of changes made on speech based documents, for instance in sections of dictated text or speech in the speech based document, are among others ease of automatically providing sharper correction information.

These and other aspects, features and advantages of which the invention is capable of will be apparent and elucidated from the following description of embodiments of the present invention, reference being made to the accompanying drawings, in which FIG. 1 illustrates the process of creating a speech-enabled document according to the prior art.

Figure 2:
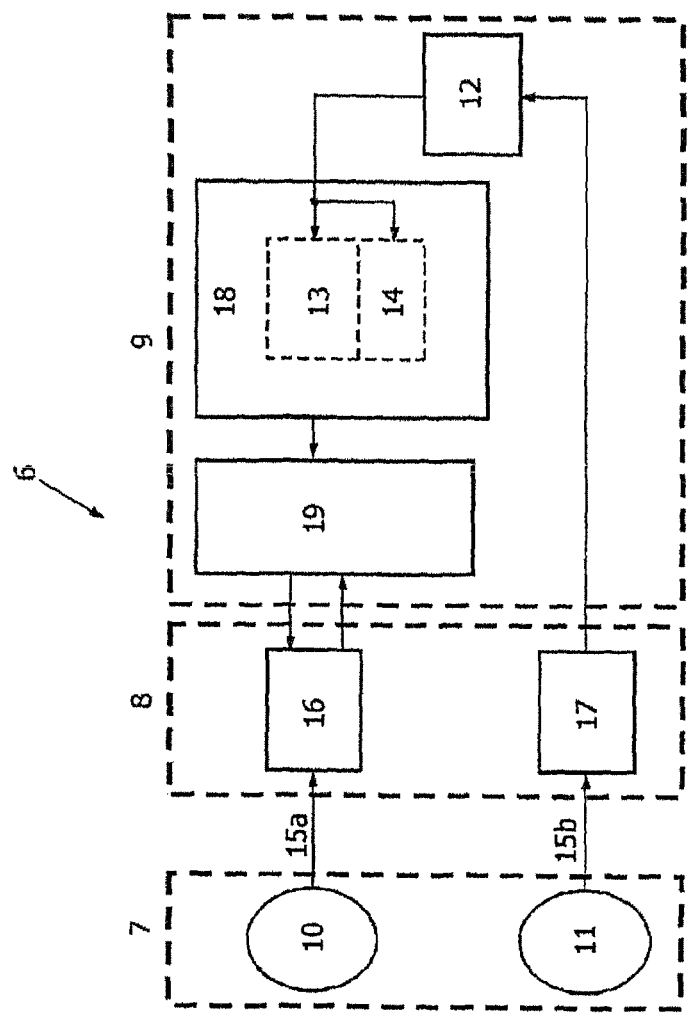

FIG. 2 illustrates a document workflow in a system according to an embodiment of the present invention.

The following description focuses on an example of the present invention applicable to speech recognition systems and in particular to a method of history tracking corrections and modifications made in text or audio in a speech based document. However, it will be appreciated that the invention is not limited to this application but may be applied to many other dictation or voice managed systems.

The type of a speech based document varies from plain text to forms and templates. A speech based document may be started without any text or the document might be prepared, containing text elements to be changed slightly. A speech based document may be highly structured or unstructured. A structure may be defined statically or created dynamically from a set of document building elements, so-called document primitives (DP).

For the sake of simplicity, "speech based documents" will be referred to as "documents" in the remainder of this specification, wherein the documents are envisaged for reproduction of information which at least partly is derived from speech.

In FIG. 1 a known document creation process, as it may work, is presented. A user, without specific speech recognition knowledge defines his Document Primitives (DPs) 1. The DPs define the type of regions included in a document, which is used as a reference layout document during dictation.

Document Primitives may be anything like:
Plain text;
Auto texts (e.g. text blocks);
Smart fields (e.g. text blocks containing dynamic elements, e.g. demographics from a database);
Named fields (e.g. identifiable place holders);
Etc.

A speech enabling framework 3 automatically converts a text document by extracting structure and content information (e.g. headings, tags, etc.) into a speech enabled document 4. Speech enabling is the activity which integrates speech recognition into a document creation workflow. A speech enabled document supports for instance dictation into it, speech navigation within it and correction/modification of it.

As is illustrated in FIG. 1, speech attributes 5 are comprised in document 4 for the entire document, which will be explained in more detail below.

In FIG. 2 an embodiment of the present invention is illustrated. The system 6 comprises a user input unit 7, a presentation unit 8 and a speech recognition framework 9. The user input unit may be a sound input unit 11 such as a microphone or a recorder, or a text input unit 10 such as a keyboard, or a mouse. The presentation unit 8 may be a computer screen 16 or a recorder and player 17 or the like where the textual or sound result is presented. The speech recognition framework 9 is a common framework, which deals with structured documents and handles dynamic documents changes. One of the features that is used in the embodiment of the present invention is a speech recognizer 12. The speech recognition framework 9 of the present embodiment is implemented as computer software running on one or more data processors and/or digital signal processors in a computer. However, the speech recognition (SR) framework 9 may also be implemented by other means, e.g. in coded hardware, in other embodiments. The SR framework 9 of the embodiment in system 6 also supports tracking on sections of text by automatically applying speech attributes to all parts of a document. This is a way of keeping track of all changes that are made on each stage of the document workflow and to find out which historical steps led to the current text and sound of speech document 13.

A set of speech attributes 14 is available for quality assurance purposes. The term speech attributes of a document are used to refer to all speech related attributes of all sections of text in a document or in a region of a document, like who dictated and/or corrected a specific part, which context associates to which part of the document, etc.

A speech attribute may be:
A dictation area (DA), i.e. the original plain text;
A recognition confidence inside a DA Recognition confidence is associated by the speech recognizer to at least one or a group of recognized words to show the probability that the recognition was working well. E.g if the confidence is low, there is a certain probability that correction will be needed, which is higher than if the recognition confidence level is high;
Detected topic of a range: A special feature of speech recognition is to associate topics (like general remarks, patient specific information, diagnostic information or any specific sub contexts of a certain context) to a group or range of words. The associated topic information may be used as additional information, e.g. for validation purposes;
Which parts were modified within a DA: If it is visible for the correctionist which part was modified by the author, it is an indication, whether the sound or the modified text is likely to be valid. If the author or the quality assurance personnel checks corrected text, the modification information may be a good indication for them also, indicating that modified part located in the DA;
Which regions of speech are replaced perfectly: A good indication that the corrected text is relevant and not the underlying sound, because the current text was already checked and corrected previously;
Which are the heard and unheard parts of a document: This information may serve as a help for the transcriptionist, e.g. for locating missing text passages in the document which are available as sections of audio data, but which are not yet transcribed into text sections of the document;

Which parts were not touched/heard by the correctionist this information may be used for indicating missed dictated text passages;

Which parts are candidate to contain serious dictation or correction problems, e.g. based on a confidence value, contains several modifications, corrected by the author and by the correctionist several times, etc.

When was a certain part corrected;

Who corrected a certain part; or

Which part was corrected by the author.

Text or sound is the primary information source for documents. Audio filters based on the recognition and correction attribute, e.g. play back the parts not heard yet by the correctionist.

An exemplary process for producing a speech document is as follows: A user dictates 11 a text by use of an user input unit. Dictation may be a plain general text dictation, dictation of a restricted topic, short texts, dictation of selected keywords identifiers, navigation commands, selection commands and/or short key (auto text) activation commands. The dictation text/file enters the speech enabling framework 9 of system 6, where a speech recognizer 12 processes the dictation material and generates a first speech recognition result 18, which comprises a first speech document 13 with speech attributes 14 related to each section of text in the first speech document. The result is inserted into a tree result representation 19, such as a database. The speech document is also converted to a text document 16, which is presented on a presenting unit 8, such as a computer screen, a player or the like. The text document 16 may later be changed by either direct text input 15a or by new complementary audio dictation 15b by one or several users. Every change results in a new speech recognition result, which comprises a new speech document and related new speech attributes. The new result is inserted into the tree result representation and linked to previous results. The text document 16 is updated continuously as changes are performed. Additional modifications may be done until a desired document is finalized. The final document comprises the transcribed text and the related speech attributes showing the complete history of every text/audio input, which has been performed into the document. An example of how a change process may be performed is presented in table 1.

TABLE 1

| Action | Example (context) | Speech attribute (who, when, what) |
|---|---|---|
| User1 dictate | What is your name | —, —, — |
| SR convert dictation | whats your number | User1, 050822, context1 |
| User2 correct by typing | What's you number | User2, 050901, context2 |
| User1 correct by speech | What is | |
| SR convert dictation | What is you number | User1, 050902, context3 |
| User2 correct by typing | What is your number? | User2, 050903, context4 |

In the example, presented in table 1, is a couple of actions together with a section of text as example and a couple of speech attributes presented that may occur during a common dictation process. Speech attribute "who" represents who makes the changes, "when" represent the date when the changes were performed and "what" represents exactly what the changes are, e.g. change "whats" into "what's".

The process starts with that a dictation is performed, e.g. by a doctor (User1). The speech recognition engine converts the dictation into a speech recognition result (SR result). The result comprises three speech attributes related to a speech document1, which are inserted in a tree result representation (TR representation). The speech attributes who1 is "User1 ", when1 is "050822" and what1 is "context1". The transcriptionist (user2) reads the text document and corrects the faults by typing and a new SR result is produced. The result comprises speech document2 and related speech attributes, who2 is "user2", when2 is "050901" and what2 is "context2". The new SR result is inserted in the TR representation and linked to preceding result. The doctor reads through the corrected text and corrects further faults by speech (dictation). The speech recognition engine converts the dictation and produces a new SR result. The result comprises speech document3 related to new speech attributes, who3 which is "user1", when3 which is "050902" and what3 which is "context3". The transcriptionist (user2) reads the text document again and corrects the text further by typing directly into the related text document. A new SR result is produced. The result comprises speech document4 related to new speech attributes, who4 which becomes "user2", when4, which becomes "050910" and what4, which becomes "context4".

Speech attributes of parts of a document may be visualized in different ways. One way of presenting the tracking history to the end user is coloring the text, e.g. text dictated by user1 is red, text typed by user1 is green etc. Additional information may be presented via tool tips, i.e. select some text, right mouse button click, a context menu comes up and displays the change history of the selected text.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to a specific embodiment, it is not intended to be limited to the specific form set forth herein. Rather, the invention is limited only by the accompanying claims and, other embodiments than the specific above are equally possible within the scope of these appended claims, e.g. different speech attributes than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of history tracking edits to an electronic document, wherein said electronic document is a speech-based document comprising one or more sections of text derived from speech dictated by a user, said method comprising:

storing, in a data structure, at least one first speech attribute associated with a section of text in said speech-based document, said at least one first speech attribute comprising information related to a first edit performed within said section of text, wherein the data structure comprises a tree-result representation;

detecting a second edit being performed within said section of text; and updating the data structure to include information related to said second edit detected within said section of text, wherein updating the data structure comprises adding at least one second speech attribute to the tree result representation, wherein the at least one second speech attribute is related to the second edit detected within said section of text.

2. The method according to claim 1, wherein the storing at least one first speech attribute associated with a section of text in said speech-based document is automatically performed in response to detecting the first edit performed within the section of text.

3. The method according to claim 1, wherein the detecting a second edit being performed within said section of text comprises detecting speech corresponding to at least a part of the section of text.

4. The method according to claim 1, wherein said second edit comprises updating at least a portion of said section of text by dictation and wherein said updating said data structure is preceded by:
   processing said dictation by a speech recognizer; and
   inserting a text representation of said dictation provided by said speech recognizer at the substantially same place in said speech-based document where said second edit was performed.

5. The method according to claim 1, wherein said second edit comprises updating said section of text by typing using an input unit into a text document, corresponding to said speech-based document, presented on a presenting unit.

6. The method according to claim 1, wherein said second edit is performed by a different user than said user.

7. The method according to claim 1, further comprising:
   detecting a third edit being performed within said section of text; and
   updating the data structure to include information related to the third edit detected within said section of text.

8. A system for history tracking edits to an electronic document, wherein said electronic document is a speech-based document comprising one or more sections of text recognized or transcribed from sections of derived from speech, wherein said sections of speech are dictated by a user and processed by a speech recognizer in a speech recognition system into corresponding sections of text of said speech based document, said system comprising:
   at least one processor programmed to:
      store, in a data structure, at least one speech attribute associated with a section of text in said speech-based document, said at least one speech attribute comprising information related to a first edit performed within said section of text, wherein the data structure comprises a tree-result representation;
      detect a second edit being performed within said section of text; and
      update the data structure to include information related to the second edit detected within said section of text, wherein updating the data structure comprises adding at least one second speech attribute to the tree result representation, wherein the at least one second speech attribute is related to the second edit detected within said section of text.

9. The system according to claim 8, wherein a structure of said speech-based document is defined statically from a set of document building elements.

10. The system according to claim 8, wherein a structure of said speech-based document is defined dynamically from a set of document building elements.

11. The system according to claim 9, wherein said document building elements are plain text, text blocks or templates.

12. The system according to claim 8, wherein said at least one speech attribute relates to which part of said speech-based document was changed, who changed said part of said speech-based document, by which means said part was changed, or when said part was changed.

13. The system according to claim 8, wherein said at least one speech attribute comprises a dictation area, a recognition confidence, a detected topic of a range, which part in said dictation area was changed, which region of said speech-based document was replaced, or which parts of said speech-based document was heard or touched.

14. The system according to claim 8, wherein said system comprises audio filters based on recognition and correction attributes.

15. A non-transitory computer-readable medium having embodied thereon a computer program for processing by a computer, the computer program being configured for history tracking edits to an electronic document, wherein said electronic document is a speech- based document comprising one or more sections of text- derived from speech dictated by a user, said computer program comprising:
   a code segment for storing, in a data structure, at least one speech attribute associated with a section of text in said speech-based document, said at least one speech attribute comprising information related to a first edit performed on said section of text, wherein the data structure comprises a tree-result representation;
   a code segment for detecting a second edit being performed within said section of text; and
   a code segment for updating the data structure to include information related to the second edit detected within said section of text, wherein updating the data structure comprises adding at least one second speech attribute to the tree result representation, wherein the at least one second speech attribute is related to the second edit detected within said section of text.

* * * * *